Oct. 20, 1931.  J. H. ASHBAUGH ET AL  1,828,272
REGULATOR SYSTEM
Filed Feb. 15, 1929
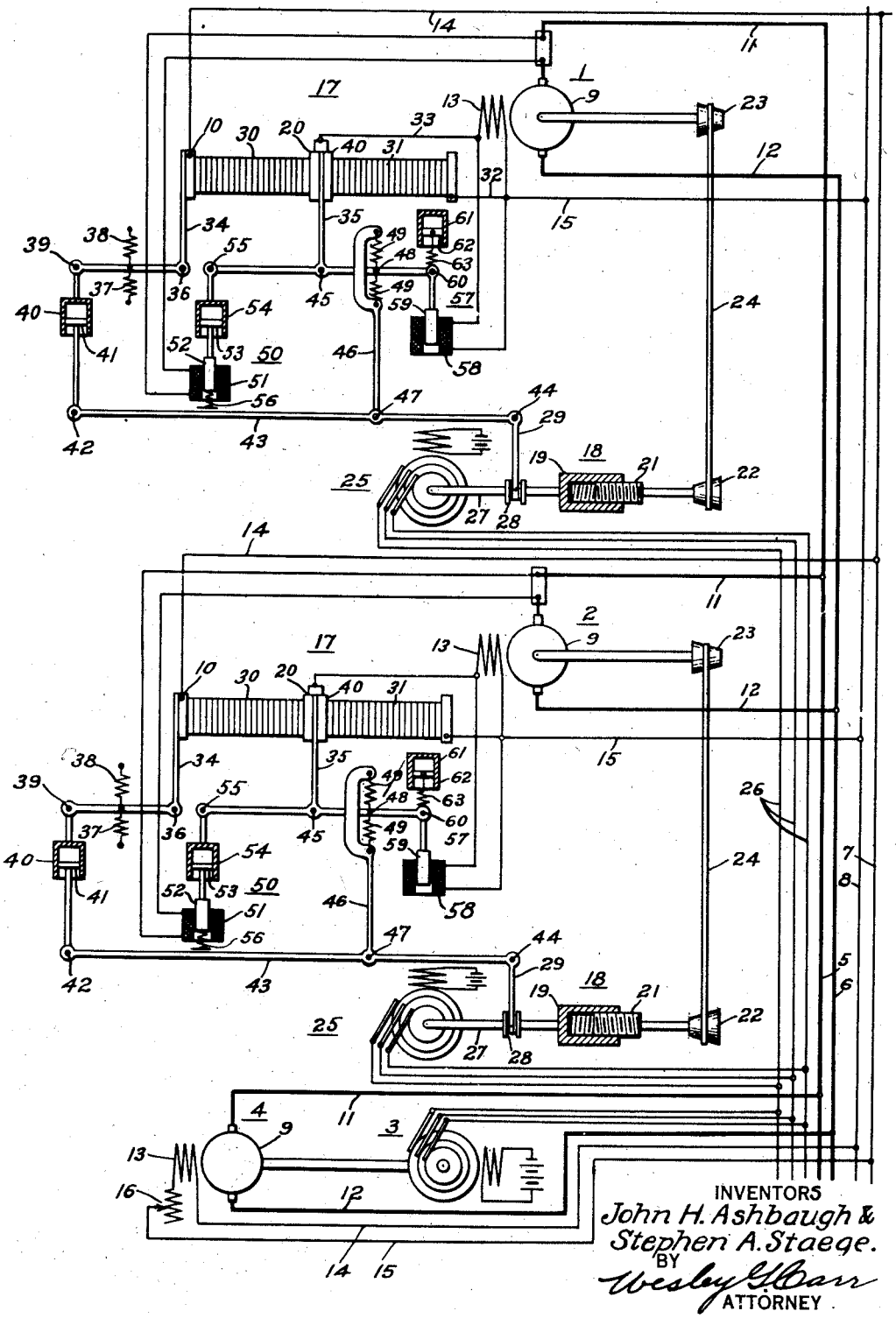
INVENTORS
John H. Ashbaugh &
Stephen A. Staege.
BY
Wesley G. Carr
ATTORNEY.

Patented Oct. 20, 1931

1,828,272

UNITED STATES PATENT OFFICE

JOHN H. ASHBAUGH, OF WILKINSBURG, AND STEPHEN A. STAEGE, OF PITTSBURGH, PENNSYLVANIA, ASSIGNORS TO WESTINGHOUSE ELECTRIC & MANUFACTURING COMPANY, A CORPORATION OF PENNSYLVANIA

REGULATOR SYSTEM

Application filed February 15, 1929. Serial No. 340,289.

Our invention relates to regulator systems for dynamo-electric machines and more particularly to a regulator wherein the resistor or regulating element is of the pressure responsive type, such as a stack of carbon wafers or pulverized conducting material.

Our invention has in mind the provision of a regulator for governing the excitation of dynamo-electric machines that is fast and accurate in its operation over a large range of operation, and that is provided with ample anti-hunting means that are effective at all machine loads.

Our invention has particular application to regulating the speeds of electric motors, where accurate speed regulation is required. In various industrial applications, such, for example, as in the operation of paper-making machines, the speeds of a plurality of motors, each driving a section of the rolls of the machine, must be so regulated as to maintain a fixed speed relation between them, in order to prevent damaging the material passing through the machine. This may be done by regulating the speed of each motor of the series in accordance with its variations in speed with respect to a standard or speed-reference machine. In describing a preferred embodiment of our invention, reference is made to an application thereof for controlling the speeds of a plurality of motors, two of which are illustrated in the drawing.

Our invention will be better understood by reference to the accompaning drawing in which the single figure is a diagrammatic view of circuits and apparatus comprising one preferred embodiment thereof.

Referring to the drawing, a plurality of section driving motors 1 and 2 are illustrated and are regulated to operate in a desired speed relation with respect to the alternating current generator 3, that is driven by a direct-current motor 4, and which acts as a speed reference means for the entire series of regulated motors. Two sources of direct-current power are provided, a variable-voltage source represented by the conductors 5 and 6 and a constant-voltage source represented by the conductors 7 and 8. Each of the direct-current motors 1, 2 and 4 is provided with an armature winding 9, that is connected by means of conductors 11 and 12 to the variable-voltage conductors 5 and 6, and with a field winding 13 that is connected by means of conductors 14 and 15 to the constant-voltage supply conductors 7 and 8. In series with the field winding 13 of the motor 4 a rheostat 16 is connected to provide means for establishing the excitation and speed of the motor 4 driving the generator 3 which motor-generator set is effective to determine the speed of operation of the regulated motors 1 and 2. The speeds of all of the direct-current motors 1, 2 and 4 are similarly varied by varying the voltage of the supply conductors 5, 6. In the circuit of the field winding 13 of the regulated motors 1 and 2, a regulator 17 is connected.

Associated with each regulator 17 and each of the regulated motors 1, 2 is a differential device 18 having two cooperating elements such as the nut and screw elements 19 and 21, respectively. One of these elements 21 is driven, in accordance with the speed of the regulated motor, through cone pulleys 22 and 23 and a cooperating belt 24 which may be adjusted upon the cone pulleys to give the desired speed relation between the regulated motor and the element 21 of the differential device. The other element 19 of the differential device, is driven by a synchronous motor 25 which is connected, by means of three phase conductors 26, to the alternating-current generator 3 and runs in synchronism therewith. The nut element 19 of the differential device is carried by a shaft 27 which is keyed to rotate with the motor 25, but arranged to slide longitudinally along the axis of the shaft, upon a relative movement of the two elements 19 and 21, of the differential device, the element 21 being mounted to rotate upon its axis without longitudinal movement. The shaft 27 carries a collar 28 that is attached to rotate therewith and to move longitudinally with the shaft. The collar 28 actuates a bifurcated rocker arm 29 in accordance with the longitudinal movement of the shaft 27, and this rocker arm constitutes the control member for the regulator 17.

The regulator 17 comprises, in the form of the invention illustrated, two stacks of graphite or carbon wafers 30 and 31 of the general character used in carbon pile regulators. The carbon pile 30 is connected in series-circuit relation with the field winding 13 of the associated motor and the carbon pile 31 is connected in parallel-circuit relation with the field winding 13.

By using two stacks of carbon piles, one in series, and one in shunt relation with the field winding of the regulated machine, and by varying their resistance oppositely, a large regulating range is available. The carbon pile 31 may be omitted where the desired range of operation can be readily controlled by the carbon-pile stack 30 alone.

The resistances of the carbon piles 30 and 31 are governed by pressure-varying lever members 34 and 35. The lever 34 is here shown as a bell-crank lever pivotally mounted on the pivot 36 and normally biased, by means of tension members 37 and 38, to a desired position. One end of the lever 34 is pressed against the terminal 10 of the carbon pile 30 and the other end of this lever is pivotally attached, by means of the pivot 39, to a dash pot 40 having a movable piston 41 therein, and which is connected through the pivot 42 to a lever 43 which is directly connected to, or forms a part of the control member 29, that is supported by and moves about the pivot 44.

The pressure varying member 35 is formed in the shape of an inverted T, one leg of which varies the pressure on the terminals 20 and 40, respectively, of the carbon piles 30 and 31. The member 35 is actuated by the lever 43 through a connecting member 46 that is pivotally attached to the member 43 at the pivot 47, and to the member 35 at the point 48, the pivot 48 being connected to the member 46 by means of biasing or tension members 49.

In addition to the means above described for actuating the pressure varying members in accordance with the movement of the rocker arm 29 and the differential device 18, two electro-responsive means are provided for actuating the pressure member 35 in accordance with the electrical conditions of the regulated machine. An electromagnet 50 is provided having a coil winding 51, that is connected to be energized in accordance with the armature current of the regulated motor, and with a core member 52. The core member 52 is connected through the piston 53, dash pot 54 and pivot 55 to influence the pressure member 35 during movement of the core member 52 against the spring member 56 which normally holds the core 52 in a raised position.

An electromagnet 57 is also provided having a winding 58, that is connected in parallel-circuit relation to the field winding 13 of the regulated motor, and a core 59 that is connected by a pivot 60 to the pressure varying member 35. A dash pot 61 is also provided mounted in a fixed position and cooperating with a piston 62 that is connected by means of a biasing member 63 to a convenient point on the pressure varying member 35 such as the pivot 60.

As previously stated, each section master motor 25 is driven from the alternating-current generator 3 in accordance with the speed of the motor 4 which determines the speed of the entire series of regulated motors, and each section master motor 25 drives one side 19 of the associated differential device 18, and the other side 21 of the differential device is driven from the associated regulated motor, 1 or 2, through the cone pulleys 22 and 23 and the belt 24. The successive motors of the machine operate at slightly different speeds to allow for the "draw" or elongation of the paper during the manufacturing process. The necessary adjustment of the regulator is made by varying the position of the belt 24 on the cone pulleys.

When the speed of the cone pulley 22 corresponds to that of the associated master motor 25, there is no relative motion between the screw and nut elements 21 and 19, but upon a change in the speed of the cone pulley 22, or an angular displacement of the cone pulley, with respect to the motor 25, this difference in speed or angular displacement will cause the screw member 21 to be rotated within the nut member 19, thus causing the shaft 27 carrying the collar 28 to be moved longitudinally, and actuate the rocker arm 29 and the extension thereof 43 about the pivot 44. Any change in angular displacement between the pulley 22 and that of the synchronous motor 25 will cause a continuous movement of the screw member 19 in one direction or the other which will continue as long as a change in the angular displacement, or a speed difference, exists between the pulley 22 and the motor 25.

The movement of the lever 43 in one direction or the other causes the pressure elements 34 and 35 to be actuated away from, or toward, each other, thus decreasing or increasing the resistance of the carbon pile 30 and oppositely varying the resistance of the carbon pile 31. The pressure member 34 will be promptly actuated upon movement of the control member 29 and is gradually returned to its neutral position by action of the springs 37 and 38, and the slippage of the dash pot 40, and the pressure member 35 will be gradually actuated as a result of its resilient connection to the control member 29 and the action of the retarding dash pot 61.

Upon an increase in the motor speed the differential device will cause the lever 29 to be rotated in a clockwise direction tending to compress the pile 30, thereby increasing the voltage across the motor field winding 13, thus tending to reduce the motor speed. Upon an increase in the voltage across the field winding 13, the energization of the electromagnet 57 is increased and the core member thereof is actuated downwardly, thus rotating the pressure member 35 about the pivot 45 in a clockwise direction, and thus reducing the pressure on the carbon pile 30 and increasing the pressure on the carbon pile 31, and tending to decrease the excitation of the field winding 13. The electromagnet 57, therefore, acts as an anti-hunting magnet, its operation following that of the control member 29 and its effect being to partially oppose the change in field excitation caused by the operation of the control member 29.

The above described increase in the voltage across the field winding 13 causes an increase in field flux and therefore a decrease in armature current causing a decrease in the energization of the electromagnet 50, thus permitting rotation of the pressure varying member 35 in a clockwise direction about the pivot 45, and thereby introducing an additional anti-hunting action into the system.

The tendency of the core member 52 to be drawn downwardly upon an increase in the energization of the winding 51 is resisted by the spring 56 which is so designed as to offer an increasing resistance as the core moves downwardly. Where the armature current of the motor does not vary over too wide a range, the dash pot 54 may be eliminated using a solid connection from the core 52 to the pivot 55. When this is done the spring 56 may be omitted. With this connection the electromagnet 50 functions as a current regulator for the armature circuit of the motor.

It will be noted that the pull of the electromagnet 57 has a permanent effect upon the position of the pressure member 35 since the core member 59 of the electromagnet is directly connected to the pressure member. The electromagnet 50, however, has only a transient effect upon the pressure member 35 during, or immediately after, a sudden change in armature current since the connection of the core member 52 to the pressure member 35 is through the air dash pot 54 and cooperating piston 53, and, as soon as the air passes the piston 53, the electromagnet 50 no longer influences the pressure member 35. The stationary dash pot 61 acts as a retarding device to prevent a rapid movement of the pressure member 35 until the air has by-passed the piston 62. The spring member 63, connected between the piston 62 and the pivot 60, however, permits a quick movement of the pressure member 35 within a small range, the final movement being retarded until the piston has taken a new position. This dash pot, therefore, affords a relatively free movement of the pressure member 35 within a small range and has an increased damping action as the magnitude of a sudden movement of the pressure member increases.

If a sudden load is thrown on the regulated motor causing it to slow down in speed or lag in angular displacement behind the master motor 25, the differential device is so actuated as to move the lever 43 downwardly in accordance with the change in phase displacement of the regulated motor from the master motor. The electrode 10 is momentarily actuated away from the pile 30, thereby increasing the resistance in the field winding circuit of the motor a relatively large amount, perhaps several times the amount required to eventually correct the motor speed. The electrode 10 is biased by the springs 37 and 38 and tends to assume its former position as soon as the air in the dash pot 40 has passed the piston 41. At the same time the pressure member 35 has been actuated in a clockwise direction as a result of the resilient or biasing connection between the pivot points 48 and 47, which tend to further increase the resistance in series with the motor field.

Upon the above-described actuation of the regulator to change the resistance in the field winding circuit of the motor, the voltage across the field winding 13, and across the electromagnet coil 58, is reduced and the core 59 moves upwardly, compressing the spring 63 and causing a movement of the piston 62. This action tends to actuate the pressure member 35 to rotate in a counter-clockwise direction about the pivot 45 thus reducing the resistance of the carbon pile 30. The reduction in the voltage across the field winding of the regulated motor, caused by the initial operation of the regulator 17 by the differential device 18, reduces the counter-electromotive force of the motor and permits an increase in the current through the armature thereof and through the winding 51 of the electromagnet 50. This increased current causes the core 52 of the electromagnet to be moved downwardly and to momentarily further actuate the pressure member 35 in a counter-clockwise direction. This latter influence lasts only while the air is by-passing the piston 53 of the dash pot.

It will, therefore, be seen that the reactive or the anti-hunting effects of the electromagnets 57 and 50 are in the same direction, although that of the electromagnet 50 is transient while that of the electromagnet 57 is permanently a function of the voltage across the field winding coil of the regulated motor.

It will be obvious, that, while we have described our regulator as being particularly applied to govern the speed of one motor with respect to that of a master motor by actuating the control element of the regulator in accordance with the differential speeds of the two motors, the regulator may be used for governing the excitation of a dynamo-electric machine in accordance with any desired quantity by actuating the control element 29 in accordance with variations of that quantity from its desired value.

Many modifications may be made in the apparatus and circuits described without departing from the spirit of our invention and we do not wish to be limited other than by the scope of the appended claims.

We claim as our invention:

1. In a regulator system, a dynamo-electric machine having a field winding, a variable pressure resistor connected in series with said field winding, means for varying the pressure applied to said resistor comprising an electromagnet energized in accordance with the voltage of said field winding, an electromagnet energized in accordance with the load current of said machine, and means actuated in accordance with variations in the regulated quantity from its desired value.

2. In a regulator system, a dynamo-electric machine having a field winding, a variable pressure resistor connected in series-circuit relation with said field winding, means for varying the pressure applied to said resistor in accordance with variations in the regulated quantity, electromagnetic means responsive to the load conditions of said machine, and electromagnetic means responsive to field voltage of said machine, said last two named means being actuated after and contrary to said first named means.

3. In a regulator system, a dynamo-electric machine having a field winding, a variable pressure resistor connected in series with said field winding, means for varying the pressure applied to said resistor comprising means actuated in accordance with variations in the regulated quantity, and anti-hunting means actuated in accordance with the load current of the dynamo-electric machine.

4. In a regulator system, a dynamo-electric machine having a field winding, a variable pressure resistor connected in series with said field winding, means for varying the pressure applied to said resistor comprising means actuated in accordance with variations in the regulated quantity, and anti-hunting means actuated in accordance with the excitation of the field winding of said machine.

5. In a regulator for governing the excitation of a dynamo-electric machine, a variable resistor element that is responsive to the pressure thereon, a member actuated in accordance with variations in the regulated quantity from its desired value, and two pressure changing members actuated thereby, one of said pressure changing members being characterized by being promptly responsive to a movement of the first-named member followed by a gradual return to its prior position, and the other of said pressure changing members being characterized by being responsive gradually to a movement of the first-named member.

6. In a regulator for governing the excitation of a dynamo-electric machine, a variable resistor element that is responsive to variations in pressure thereon, a control member actuated in accordance with variations in the regulated quantity from its desired value, two pressure changing members actuated thereby, one of said pressure-changing members being connected to said control member through a relatively stiff cushioned coupling, and means for biasing said member to a predetermined position, the other of said pressure-changing members being connected to said control member by means of a resilient biasing connection.

7. In a regulator for governing the excitation of a dynamo-electric machine, a variable resistor element that is responsive to variations in pressure thereon, a control member actuated in accordance with variations in the regulated quantity from its desired value, two pressure changing members actuated thereby, one of said pressure-changing members being connected to said control member through a cushioned coupling, and means for biasing said member to a predetermined position, the other of said pressure changing members being connected to said control member by means of a resilient biasing connection, and retarding means for said last-named member to prevent hunting thereof.

8. In a regulator for governing the excitation of a dynamo-electric machine, a variable resistor element that is responsive to variations in pressure thereon, a control member actuated in accordance with variations in the regulated quantity from its desired value, two pressure changing members actuated thereby, one of said pressure-changing members being connected to said control member through a cushioned coupling and means for biasing said member to a predetermined position, the other of said pressure-changing members being connected to said control member by means of a resilient biasing connection, and electro-responsive anti-hunting means for actuating said last-named pressure changing member in accordance with the electrical conditions of the regulated machine.

9. In a regulator system, a dynamo-electric machine having a field winding, a resistor element that is responsive to variations in the pressure exerted thereon, a control member actuated in accordance with variations in the regulated quantity from its desired value, two pressure varying members actuated by said control member for varying the resistor element, one of said pressure varying members being connected through a resilient biasing means to follow movements of said control member, and retarding means for permitting a gradual movement only of said pressure varying member, biasing means for normally biasing the other of said pressure varying members to a given position, said member being connected to be actuated in accordance with movements of said control member and returned thereafter by said biasing means to said given position.

10. In a regulator system, a dynamo-electric machine, a variable-pressure resistor connected to control the excitation of said dynamo-electric machine, means for varying the pressure applied to said resistor comprising means actuated in accordance with variations in the regulated quantity, and anti-hunting means actuated in accordance with the excitation of said machine.

11. In a regulator system, a dynamo-electric machine, a variable-pressure resistor connected to control the excitation of said machine, a speed reference, and means differentially responsive to the speeds of said dynamo-electric machine and said speed reference for varying the pressure applied to said resistor.

12. In a regulator system, a dynamo-electric machine, a variable-pressure resistor connected to vary a given quantity of said system, means differentially responsive to variations in the regulated quantity from its desired value for varying the pressure applied to said resistor, and anti-hunting means actuated by said last named means for temporarily increasing the variation in pressure applied to said resistor.

13. In a regulator system, a dynamo-electric machine, a variable-pressure resistor connected to vary a given quantity of said system, two pressure elements for varying the pressure applied to said resistor, a control member actuated in accordance with variations in the regulated quantity from its desired value for actuating said pressure elements, and means associated with one of said pressure elements for returning it to a neutral position after it has been actuated by said control element.

14. In a regulator for governing the speed of an electric motor, a variable-pressure resistor, a differential mechanism, one side of which is actuated in accordance with the speed of said motor, and means for varying the pressure on said resistor in accordance with the phase relation of the elements of said differential.

In testimony whereof, we have hereunto subscribed our names this 5th day of February, 1929.

JOHN H. ASHBAUGH.
STEPHEN A. STAEGE.